Oct. 16, 1923.
A. F. LEE
1,471,039
BROILER
Filed June 17, 1922
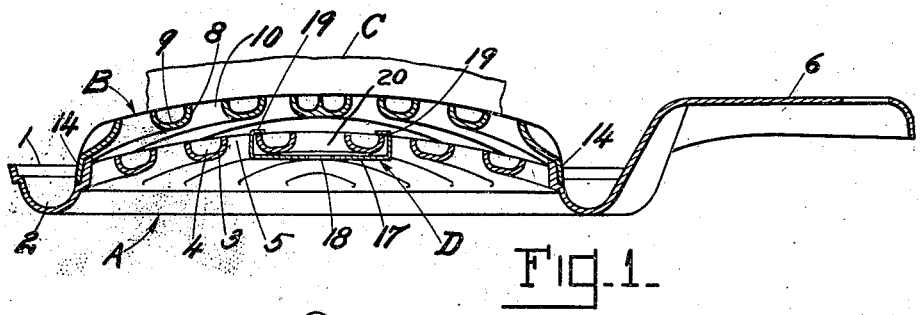
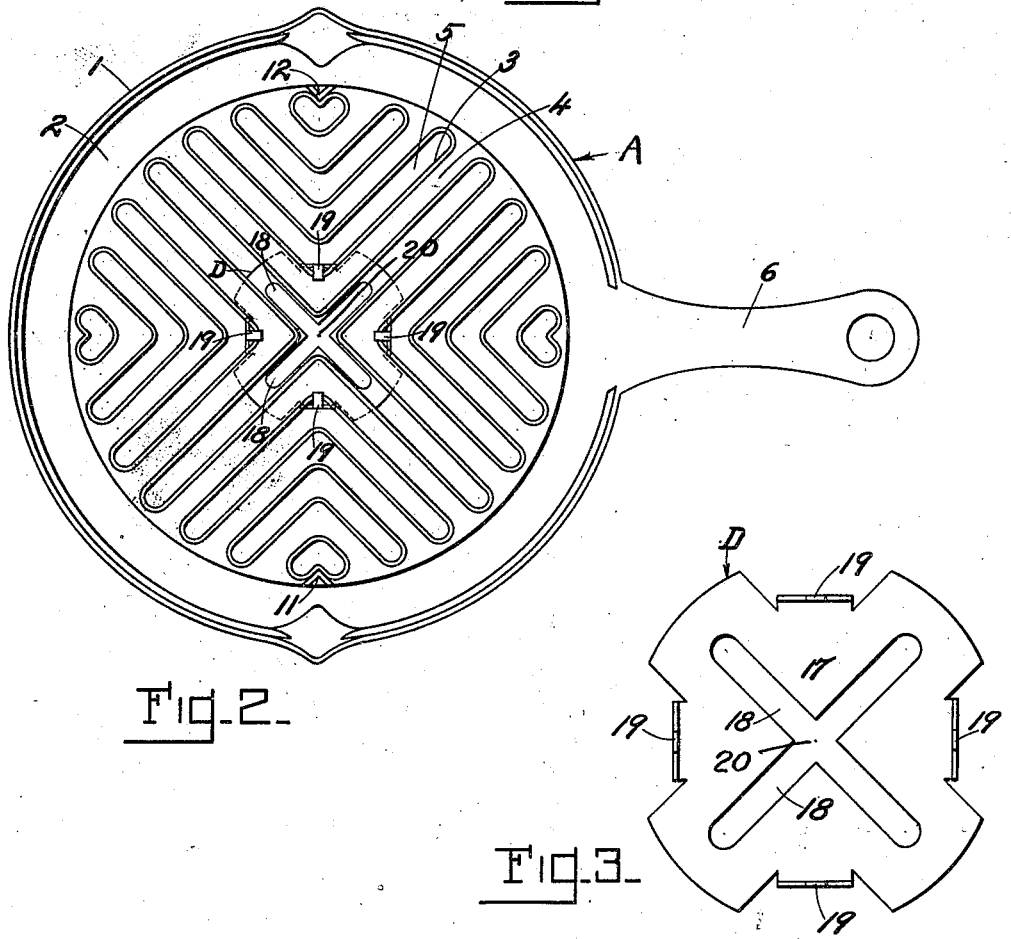
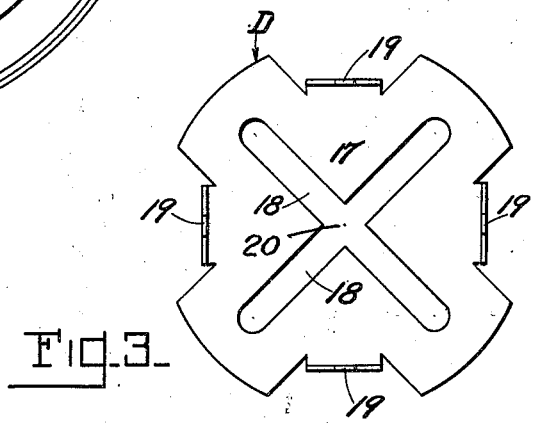
INVENTOR:
Alexander F. Lee
by MacLeod, Calver, Copeland & Dike
Attys.

Patented Oct. 16, 1923.

1,471,039

UNITED STATES PATENT OFFICE.

ALEXANDER F. LEE, OF CAMBRIDGE, MASSACHUSETTS.

BROILER.

Application filed June 17, 1922. Serial No. 569,141.

*To all whom it may concern:*

Be it known that I, ALEXANDER F. LEE, a citizen of the United States, residing at Cambridge, county of Middlesex, State of Massachusetts, have invented a certain new and useful Improvement in Broilers, of which the following is a specification, reference being had therein to the accompanying drawings.

The invention relates to a new and useful improvement in broilers. Broilers are sometimes made of certain kinds of metals or alloys which have a relatively low fusing point. Aluminum or aluminum composition is frequently employed, because of the lightness and cheapness of construction and being easy to keep clean. When made of such composition, however, it sometimes becomes fused or burned so badly as to destroy the broiler. This fusing is especially apt to take place at the center portion of a broiler where it is exposed to the greatest heat, particularly so when the broiler is used over a gas stove.

The object of the present invention is to provide a protector for that portion of the broiler which is thus exposed to the most intense heat, in such manner that the protector will not interfere with the efficiency of the broiler.

The invention will be shown and described herein as being embodied in a duplex broiler of skeleton formation, although it is to be understood that the invention is not limited to the particular form of broiler shown nor to a duplex style of broiler.

The invention will be fully understood from the following description when taken in connection with the accompanying drawings, and the novel features thereof will be pointed out and clearly defined in the claims at the close of this specification.

In the drawings, Fig. 1 is a vertical sectional view of a duplex broiler embodying the invention.

Fig. 2 is a plan view of the lower grid member to which the protector is applied.

Fig. 3 is a detail plan view of the protector before it is attached to the grid.

Referring now to the drawings, A represents the lower grid member and B the upper grid member. The lower grid member A is of spider formation, consisting of a disk 1 having an annular groove or depression 2 on its upper side around the inside of the periphery, and a central grid portion formed with ribs 3 having longitudinal grooves or channels 4. Preferably the grid portion is crowned in the center so that there is a slope in all directions from the center. The grooves or channels 4 in each one of the ribs 3 lead from the highest point of each channel down into the annular groove or channel 2. The arrangement of the channel ribs 3 leaves right-angled slots or spaces 5 between the adjacent right-angled ribs. The grid A is provided with a handle 6.

The upper grid B is formed with a plurality of ribs 8 preferably of similar formation to the ribs of the grid A, which are formed with channels 9 symmetrically arranged in the same manner as the ribs of the grid A with spaces 10 between the ribs. The ribs 8 are preferably a little wider than the spaces 5 between the ribs 4 of the grid A. The grid B is also crowned and so constructed that it may be superimposed upon the lower grid in position for the ribs of the grid B to overlie the spaces between the ribs of the lower grid A.

Preferably means are provided whereby the two grids may be properly centered with relation to each other so as to prevent the upper grid from being rotated to uncover the open spaces in the lower grid. In the construction shown the lower grid is formed with upwardly extending lugs 11—12, opposite each other near the edge which engage with notches in the upper grid. The upper grid is supported at some distance above the lower grid by means of feet 14 to allow free circulation between the two grids.

The meat, as shown at C, will be placed on the upper grid. As the juices escape during the broiling they will for the most part run into the channels of the upper grid, and thence pass out at their outer ends into the channel 2 of the lower grid. Juices which fail to be carried off by the channels of the upper grid will drip into the channels 4 of the lower grid and thence be carried into the general channel 2 of the lower grid.

The heat and flame will pass up through the spaces in the lower grid and thence be deflected by the ribs of the upper grid and pass up through the spaces between the ribs of the upper grid to come in contact with the meat resting on the upper grid as well as thoroughly heat the ribs of the grid.

It will be obvious that where the heat is concentrated the under side of the lower grid will be exposed to the greatest heat, and where gas burners are employed in the usual manner the heat will be concentrated or will be most intense at the central portion of the lower grid. The special feature of this invention is to provide a protector for the underside of this lower grid of such character and construction that it will not interfere with the proper heating of the grid nor interfere with the passage of the flame and heat to the upper grid and to the meat. To this end, therefore, I provide a protector device D which is attached to the lower grid. In the form shown this protector device consists of a disk or plate 17, which has a coefficient of fusion sufficiently high so that there is no danger whatever of its fusing under any degree of heat that the broiler is likely to be subjected to. Preferably this protector should be a good conductor of heat. This protector should also be so constructed as to not interfere with the passage of the flame between the ribs of the lower grid. For that reason the disk is formed with slots 18 which register with the slots between the ribs 3 of the lower grid.

For convenience and simplicity of construction the protector D is attached to the ribs of the grid A by means of fingers 19 which are formed integrally with the protector disk D. The disk is first formed with these fingers 19 extending upward, as shown in Figure 3, the fingers being of malleable metal, so that when the disk is properly positioned centrally on the under side of the lower grid the said fingers may be bent over so as to hook on to the upper side of the ribs 3.

The protector may be easily detached from the grid at any time by straightening out the hooked ends of said fingers, so that if by any chance the protector should become destroyed or for any reason it should be desired to attach a new one, it can be readily done without injuring in any way whatever the grid itself. In that way, even though the protector should be of equally fusible metal as the grid and should become burned out, it would cost very little to replace it by a new one, thus saving the expense of an entirely new grid.

By reference to Figure 2, which shows the lower grid, it will be observed that four of the slots 5 between the ribs are radial slots which intersect at the center forming an open space 20 at the intersection which is also the center of the grid, whereas in the upper grid the ribs intersect at the center, as shown in Figure 1. One objection to having the ribs of the lower grid intersect at the center is, that, as the grid is exposed to the greatest heat at the center, if the ribs intersect so that there are four ribs integral with each other, branching away from the center, they are likely to crack at their point of intersection during the expansion and contraction. By making the open space at the center, this danger is avoided as the flame goes through the open space instead of against the metal. Another objection to having intersecting ribs in the place of the intersecting slots, is that by having metal in the center, it would interfere with the passing of the heat up through the intersecting slots 18 of the protector 17 to the upper grid. It will be noted that as constructed, the radial, intersecting slots of the lower grid register with the radiating slots 18 of the protector.

What I claim is:—

1. A broiler having a grid formed with ribs and open spaces between the ribs, and a heat protector of much smaller diameter than the grid attached to the under side of the middle of the grid, said heat protector being formed with slots which register with the open spaces between the ribs of the grid.

2. A broiler having a grid member formed with ribs and open spaces between the ribs, and a heat protector consisting of a metallic disk of much smaller diameter than the grid secured to the ribs of said grid in such manner as to be positioned beneath the middle of the grid, said disk being formed with slots which register with the spaces between the ribs.

3. A broiler comprising two grid members, one superimposed upon the other, each having ribs extending to the outer periphery from some distance inward and having slots between said ribs, the lower grid member having two of said slots diametrically crossing the grid and intersecting each other at about right angles at the center thereof.

In testimony whereof I affix my signature.

ALEXANDER F. LEE.